United States Patent [19]

Matter

[11] 4,228,580
[45] Oct. 21, 1980

[54] PROCESS FOR MAKING WROUGHT, LEAD-CALCIUM BATTERY GRID ALLOY HAVING HIGH TEMPERATURE TENSILE STRENGTH STABILITY

[75] Inventor: Robert C. Matter, Anderson, Ind.

[73] Assignee: General Motors Corporation, Detroit, Mich.

[21] Appl. No.: 940,993

[22] Filed: Sep. 11, 1978

Related U.S. Application Data

[63] Continuation-in-part of Ser. No. 886,078, Mar. 13, 1978, abandoned.

[51] Int. Cl.$^3$ .................. C22F 1/12; C22C 11/02
[52] U.S. Cl. .................. 29/527.7; 148/11.5 R
[58] Field of Search .................. 29/527.7; 148/11.5 R, 148/2; 75/167

[56] References Cited

U.S. PATENT DOCUMENTS

| | | | |
|---|---|---|---|
| 1,813,324 | 7/1931 | Shoemaker | 148/11.5 |
| 1,880,746 | 10/1932 | Bouton | 148/11.5 |
| 2,159,124 | 5/1939 | Betterton et al. | 75/167 |
| 2,189,064 | 2/1940 | Gillis et al. | 148/11.5 |
| 3,706,605 | 12/1972 | Newbury et al. | 148/11.5 R |
| 3,953,244 | 4/1976 | Prengaman | 29/527.7 |

FOREIGN PATENT DOCUMENTS 1439888  6/1976  United Kingdom .

OTHER PUBLICATIONS

"Lead-Calcium(-Tin) Alloys . . . ," Rose and Young, Paper Presented at 5th Int'l Lead Conference, Paris, Nov. 18–22, 1974.

"Effects of Corrosion . . . ," Lander, Electro-Chem. Soc., 1952, pp. 467–473.
"A Study of Lead Base Alloys," (Proj. #ARF2745), Oct. 9, 1962, Armour Research Found. of Ill. Inst. of Tech.
"The Influence of Calcium on the Creep Characteristics of Lead," Metallurgia, Mar. 1949.
"An Investigation of Creep Fracture . . . ," Dollins, Engrg. Experiment Sta Bulletin Series No. 318, Jul., 1948, p. 50.

*Primary Examiner*—Milton S. Mehr
*Attorney, Agent, or Firm*—Lawrence B. Plant

[57] ABSTRACT

Process for making wrought, recrystallized, leadcalcium, battery grid alloy having high temperature tensile strength stability and excellent corrosion resistance involving rapidly, unidirectionally, cold rolling a cast lead alloy strip containing about 0.07% to about 0.11% by weight calcium and up to about 1.5% by weight tin. The rolling of the alloys is done such as to strain harden them before any significant strain aging thereof can occur during rolling and such that the strip recrystallizes at room temperature to a fine grained microstructure within about 30 days after rolling; has both room and high temperature (i.e., 150° F.) tensile strength stability greater than 5000 psi; and has small islands of a structureless phase distributed throughout the microstructure for reducing intergranular corrosion. Alloys containing up to about 0.35% tin may be rolled by a variety of schedules to produce this result. Alloys containing over 0.35% tin are rolled by a reduction schedule having at least six (6) reductions of about equal thickness.

4 Claims, 5 Drawing Figures

PROCESS FOR MAKING WROUGHT, LEAD-CALCIUM BATTERY GRID ALLOY HAVING HIGH TEMPERATURE TENSILE STRENGTH STABILITY

This application is a Continuation-in-Part of copending application Ser. No. 886,078, filed Mar. 13, 1978, abandoned.

BACKGROUND OF THE INVENTION

This invention relates to automotive (i.e., SLI- and motive power-type) lead-acid storage batteries of the maintenance-free variety which do not require routine water additions while in service. More specifically, this invention relates to the wrought, lead-calcium alloy strip used in the manufacture of grids therefor which are less than about 0.07 in. thick.

Wrought, lead-calcium-tin (i.e., 0.065% Ca, 0.7% Sn) alloys have been conventionally rolled into grid-making strip using high speed tandem mills (i.e., unidirectionally) and subsequently expanded into battery grids according to the process described in Wheadon et al U.S. Pat. No. 3,881,952. It has been said that the calcium and tin content of such alloys can vary between about 0.03% to about 0.10% by weight Ca and between about 0.3% to about 2.0% by weight tin if the tin-to-calcium ratio is at least 7:1 and the alloy is worked before age hardening occurs to yield a stable microstructure resistant to room temperature recrystallization and grain growth, and possessing room temperature stability. Expanded battery grids made from such wrought alloy have demonstrated loss of tensile strength in normal automotive service, especially in the warmer climates, where the battery is consistently exposed to elevated temperatures which promote recrystallization of the alloy and a consequent loss of a significant amount of its tensile strength. This loss in tensile strength promotes early failure of the batteries due to breaking of the grids resulting from the vibration and shock automotive batteries experience. Moreover, such a weakened and recrystallized grid has less resistance to plate growth and is susceptible to catastrophic intergranular corrosive attack.

Accordingly, it is an object of the present invention to provide a process for making strips of wrought, recrystallized, lead-calcium and lead-calcium-tin battery grid alloys which possess stable tensile strength at room temperature as well as at 150° F., and have a reduced susceptibility to catastrophic intergranular corrosion. This and other objects and advantages of the present invention will become more readily apparent from the detailed description thereof which follows.

BRIEF DESCRIPTION OF THE INVENTION

Figure 1:
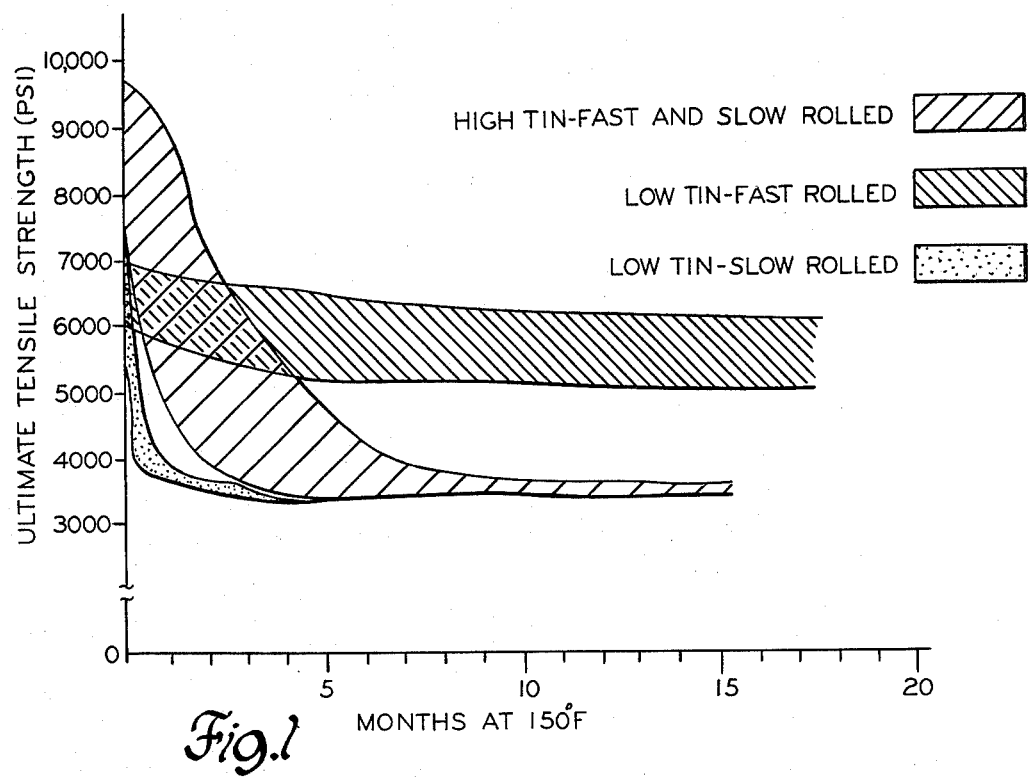
FIGS. 1 and 2 are plots of the tensile strength of a variety of lead-calcium and lead-calcium-tin alloys worked in various ways, soaked at 150° F. for a prolonged period of time and periodically tested throughout the soak period.

The present invention comprehends casting an alloy strip containing about 0.07% to about 0.11% Ca (preferably 0.08% to 0.10%) and up to 1.5% Sn (preferably about 0.2% to 0.35%). Thereafter, and before any significant age hardening occurs, the strip is rolled in one direction through several successive stages to a significantly lesser thickness such that the rolling is completed as fast as possible following commencement thereof and such that the rolled strip: will undergo major room temperature recrystallization within about 30 days following rolling; will have a recrystallized microstructure comprising a substantially homogeneous admixture of small equiaxed (i.e., <0.004 in.) grains and columnar grains; will exhibit a structureless phase dispersed throughout a lamellar-structured phase and will have a tensile strength of at least about 5000 psi which is stable both at room temperature and 150° F. for periods in excess of the year. For alloys containing from 0 to about 0.35% by weight tin (hereinafter "low-tin" alloys), this can be achieved by a variety of conventional rolling schedules based on percentage reductions from preceding reductions as discussed hereinafter, whereas for alloys containing more than about 0.35% by weight tin (hereinafter "high-tin" alloys) it is achieved by a special rolling schedule involving at least six (6) substantially equal thickness reductions wherein each reduction equals approximately the total reduction divided by the number of reductions. In contrast to conventional rolling which effects most of the reduction in the first few passes, the effect of the special schedule is to effect equal reduction throughout the schedule and to more gently work the strip at the beginning of the schedule and more severely work it at the end. Rolling of substantially continuous strips is accomplished by unidirectional rolling, as in a tandem mill, where the time lapse between rolls is minimized in contrast to reversing mill rolling where valuable time between reductions can be lost due to machine adjustment and strip handling (e.g., coiling and uncoiling). In this regard, reversing mill tests with high-tin alloys and with as little as fifteen (15) minutes between reductions did not yield wrought strip comparable to that achieved by the unidirectional rolling procedure.

The term "fast-rolled" as used herein is intended to relate to the speed at which the strip moves unidirectionally completely through its rolling schedule and will include time intervals between rolling stations (i.e., rolls in a tandem mill) of up to about 30 seconds (preferably less than about 10 seconds). While the precise metallurgical mechanism underlying this invention is not fully understood, it is believed that extremely short time intervals between successive rolling stations permits strain hardening to occur without causing any significant strain aging to occur during rolling. The fast cold-working of alloys forms a highly strained strip at the exit of the rolling mill which strain apparently concurrently promotes both recrystallization and age hardening at room temperature such that the strip is highly recrystallized within about 30 days following rolling and has a microstructure comprising a substantially homogeneous admixture of essentially columnar and equiaxed grains of pearlite-like (i.e., lamellar) material and wherein the equiaxed grains are less than about 0.004 in. (mostly less than 0.003 in.) in diameter. This microstructure is highly stable even at temperatures of up to 150° F., and hence, the tensile strength and corrosion resistance attributable to small grains remains stable. This is in contrast to wrought alloys which do not recrystallize at room temperature but do recrystallize at 150° F. These latter alloys not only rapidly lose their strength, but their final strength is much lower than if the recrystallization and age hardening had occurred at room temperature. Tensile strength stability then is herein intended to mean substantially constant or slightly declining tensile strength over extended periods of time in excess of one year. High temperature strength stability is intended to mean stability at temperatures up to 150° F. Alloys, as described herein and fast-rolled according hereto, have displayed room temperature and high temperature strength stabilities in excess of 5000 psi for periods in excess of a year and a half.

Figure 4:
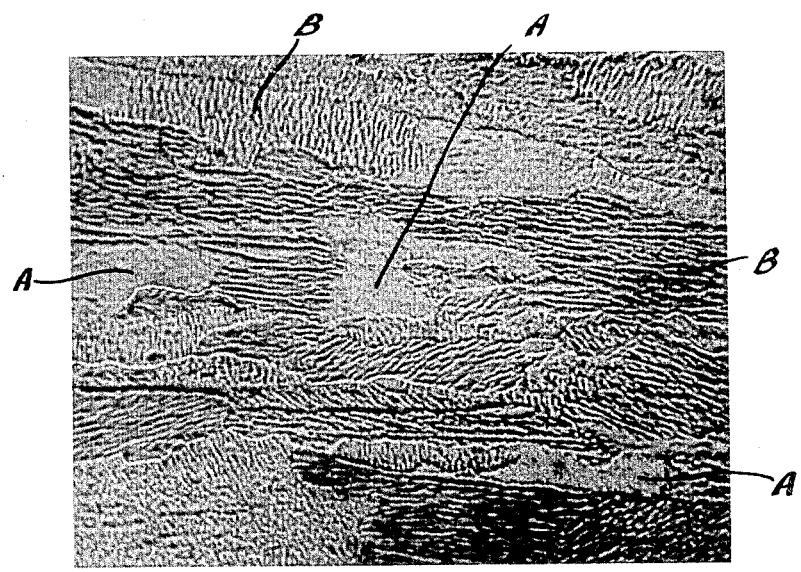
FIGS. 4 and 5 are photomicrographs (1000X) of wrought alloys made in accordance with the present invention.
Figure 5:
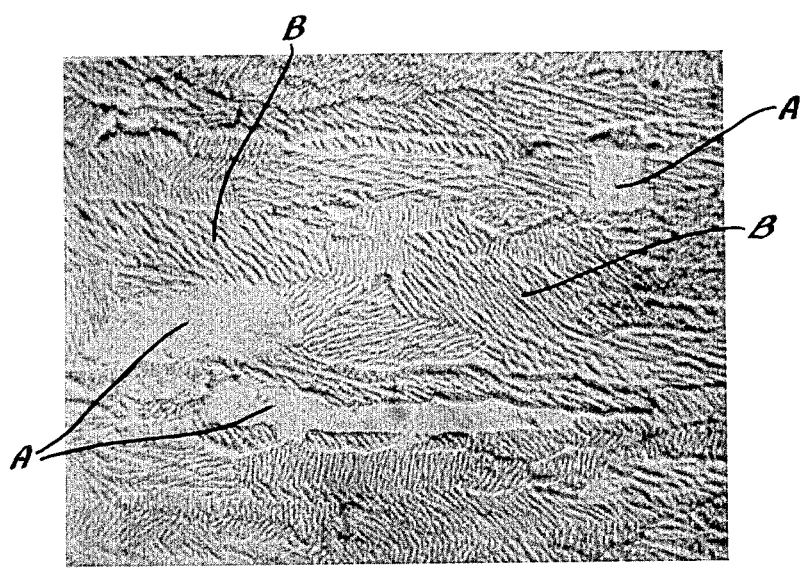

Metalographic analysis at 1000X also shows the presence of two distinct phases in strip made according to the present invention and etched with a solution containing by volume 2 parts glacial acetic acid, 2 parts hydrogen peroxide (i.e., 10% by volume) and 6 parts glycerine. Typical microstructures observed are depicted in FIGS. 4 and 5. The first and by far predominant phase is a pearlite-like lamellar-structured phase (i.e., B in the figures) which contains alternating calcium-rich and calcium-lean lamella apparently due to precipitation of a calcium-rich and/or tin-rich intermetallic out of a solid solution in lead (i.e., $\alpha$ solid solution) brought about by the cold working. Substantially uniformly dispersed through the first phase, however, are small islands of a structureless phase (i.e., A in the figures) which has an apparently uniform calcium and/or tin content/distribution, are cathodic to the lamellar-structured phase and/or grain boundaries and appear to be substantially unprecipitated $\alpha$ solid solution or $\alpha$ solid solution which had not been converted to the lamellar-structure phase by the rolling. This structureless phase A, retained after rolling according to the present invention, remains stable at 150° F. for periods in excess of one and a half years. This uniform distribution of structureless phase as small islands throughout the microstructure appears to contribute to the high resistance to catastrophic intergranular corrosion displayed by wrought strip rolled in accordance with this invention. By catastrophic intergranular corrosion is meant that form of corrosion often observed in battery grids wherein corrosion concentrates along the grain boundaries and rapidly makes inroads into and through the grid wires causing breakage thereof.

The composition of the alloy is important in connection with the fast-rolling if the benefits of this invention are to be obtained. The calcium may vary between about 0.07% by weight and about 0.11% by weight. When the calcium content exceeds about 0.11% by weight, increased drossing of the casting melt occurs and the high temperature tensile strength falls off. When the calcium content falls below about 0.07% by weight, the strip is generally weaker and the microstructure obtained has a high percentage of very large recrystallized grains (i.e., over about 0.02 in.) in nonuniform admixture with very small grains, and hence, a higher susceptibility to catastrophic intergranular corrosion. Calcium contents of about 0.08% to about 0.10% by weight consistently yield strip in the 5500 psi to 8000 psi range depending on tin content and work schedule.

The benefits of this invention are attainable with both the low-tin and high-tin versions of the aforesaid calcium alloys depending on the working schedule applied. The tin generally increases the strength and corrosion resistance of the strip over strip having no tin at all, but seems to have no effect on stability. Thus, for example, the upper portion of the low-tin, fast-rolled band shown in FIG. 1 relates to the higher tin containing alloys (i.e., 0.2% to 0.35%), whereas the lower portion of that band relates to the zero-tin and lower (i.e., <0.2%) tin content alloys. The tin also helps to retain the calcium in the melt during casting and widens the melting range of the alloy to facilitate the casting operation. Hence, some tin is preferred and about 0.2% to about 0.35% seems to provide the best results when using a conventional stage-to-stage percentage reduction schedule. For this low-tin alloy, I prefer to perform the rolling reduction in at least four (4) stages for cast stock less than about ¼ in. thick and prefer about six (6) or more stages for stock which is 3/8 in. or more thick so as not to overwork the strip at any one station. The amount of reduction that can be performed at any one station can vary considerably depending on the total thickness reduction required, and the number of stations available. It has been found that substantially uniform reductions of about 35% from station to station is quite effective to achieve strengths in the 5000 psi to 6500 psi range. Even higher tensile strengths (i.e., up to 8000 psi) are possible by using a special work schedule employing constant thickness reductions (e.g., 0.09 in.) at each rolling station. High tin (i.e., >ca. 0.35%) alloys, on the other hand, have several disadvantages when rolled according to the conventional schedule. As shown in FIG. 1, the thusly rolled high-tin alloys do not possess the high temperature stability which characterizes the low-tin alloys, and this is true regardless of the speed at which they are rolled. While the high-tin alloys will have a higher room temperature tensile strength upon heating to 150° F., they rapidly lose it and their strength falls to unacceptable levels below about 4000 psi as shown by the band labelled "High Tin—Fast and Slow Rolled (Conventional Schedule)." Moreover, it has been observed that these conventionally rolled high-tin alloys contain very little of the aforesaid structureless $\alpha$ phase, and what little phase is observed is poorly dispersed throughout the microstructure. These alloys have demonstrated poorer resistance to corrosion than strip made according to the present invention.

Good results are obtainable from the high-tin lead-calcium alloys using a special rolling schedule comprising at least six (6) (preferably nine (9) or more) reducing stations at each of which the strip's thickness is reduced by substantially the same amount. Hence, the amount of reduction occurring at each station is approximately equal to the total thickness reduction to be achieved divided by the number of reduction stations (i.e., total reduction/no. of stations). Using such a rolling schedule, all of the benefits (i.e., strength, corrosion resistance, etc.) of higher tin contents are retained without the 150° F. strength losses these alloys demonstrate when rolled conventionally. It has been observed that more rolling stations yield stronger wrought alloys. In this regard, the stabilized band labelled "High Tin—Fast Rolled (Special Schedule)" in FIG. 2 was based on different constant thickness reductions of the same alloy (i.e., 0.097% ca and 0.6% Sn). The line defining the lower limit of the band resulted from a six (6) station rolling schedule wherein the strip was reduced in thickness by about 0.058 in. at each station. The line defining the upper limit of the band resulted from a nine (9) station rolling schedule wherein the strip was reduced in thickness 0.039 in. at each station. FIG. 3 illustrates the effects of tin content on conventionally and specially rolled Pb-Ca alloys as well as the effects of more rolling stations with lesser thickness reductions per station. The solid line represents alloys rolled conventionally and shows that as the tin content exceeds about 0.35% by weight, the high temperature tensile strength after sixteen (16) months is significantly lower than for the low-tin alloys. The dashed line represents high-tin alloys rolled specially through a series of six (6) equal thickness reductions to achieve a total reduction of 0.35 in. (i.e., 0.4 in. to 0.05 in.). The dotted line represents high-tin alloys rolled specially through a series of nine (9) equal thickness reductions to achieve a total reduction of 0.35 in. (i.e., 0.4 in. to 0.05 in.). Hence, the dotted and curved lines show the effect of constant thickness reduction rolling (i.e., special schedule) on increasing the high temperature strength stability of the high-tin alloys.

Small amounts of other metals may be added to the alloys of the present invention so long as they don't interfere with the strain harden-strain aging-recrystallization mechanism discussed above or are not incompatible with the chemistry/electrochemistry of the lead-acid battery. For example, up to about 0.06% aluminum can be added as a means to reducing drossing without affecting the high temperature strength stability achieved by this invention. Moreover, experience has shown that refined secondary lead can be used with this invention and that, in fact, the impurities therein tend to promote the desired recrystallization without any apparent loss in high temperature stability. Typical such secondary leads include up to about 0.05% Bi, 0.0002% S, 0.0021% Cu, 0.0086% Zn, 0.0007% Ca, 0.0001% Cd, 0.03% Sb, 0.001% Te, 0.002% Fe and 0.0004% As.

The time interval between casting and commencement of rolling is not particularly critical in the sense of minutes or hours in obtaining the stability benefits of the present invention. It is desirable to begin rolling before age hardening has advanced significantly so that most of the age hardening will follow the strain induced by the rolling and accompany the recrystallizing of the strip. Moreover, the strip is more easily worked before any significant age hardening occurs. The as-cast, low-tin strip begins to age harden shortly after casting whereas the as-cast, high-tin alloys age harden much slowly. Hence, while successful results have been obtained with delays as much as 24 hours after casting (with about 0.25% Sn alloys), it is preferred to commence rolling as soon as possible following casting. In this regard, tests have generally shown that higher strengths are achieved by rolling shortly after casting. It has further been observed that as the tin content increases, longer casting-rolling intervals may be tolerated. As a guideline, it is preferred to commence rolling: of zero-tin alloys within about 2 hours after casting: of low-tin-containing alloys within about 4 hours after casting; and of high-tin-containing alloys within about 8 hours after casting. It is most preferred to commence rolling within a few minutes after casting so that a truly continuous process can be had as well as maximum strengths obtained.

The temperature at which the rolling is performed need only be below the recrystallization temperature of the alloy under the working conditions employed. It is preferred to introduce the strip to the rolling mill at room temperature, continuously bathe the mill in water and remove the strip at about the same temperature. However, strip may be withdrawn from the mill up to about 150° F. without difficulty.

Figure 2:
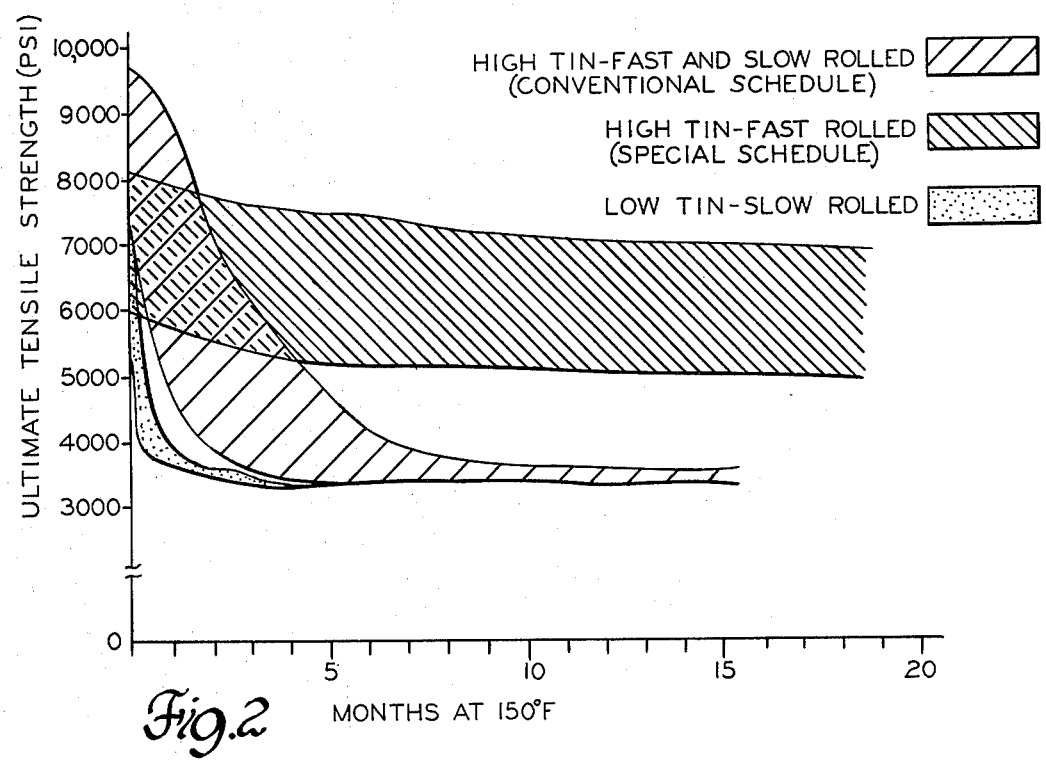
Figure 3:
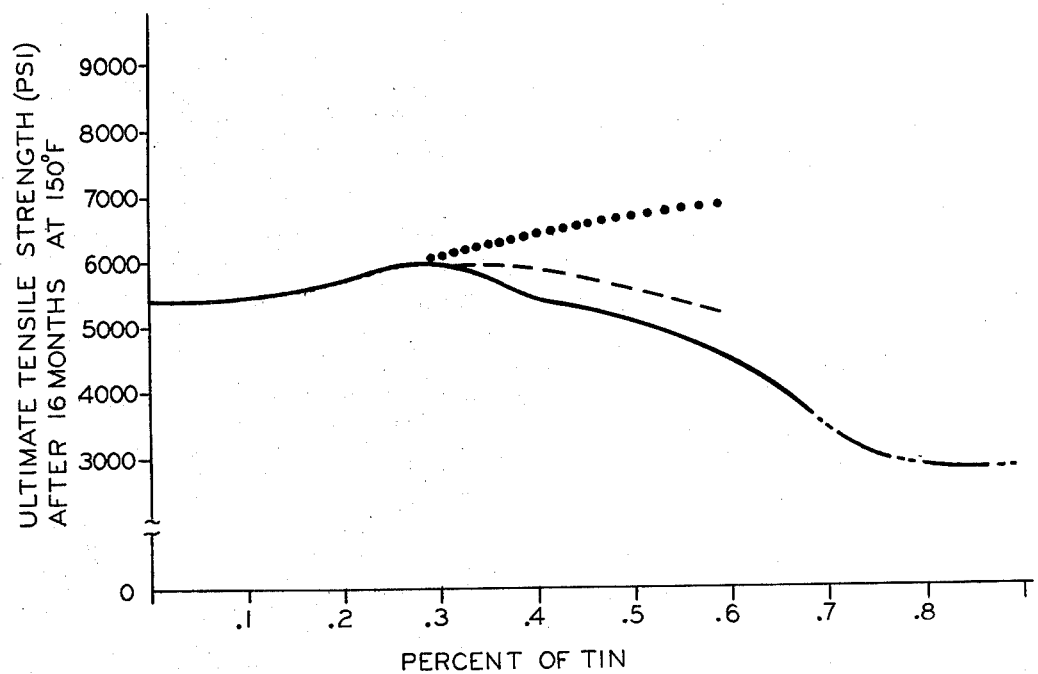
FIG. 3 is a plot of tin concentration versus high temperature strength stability of conventionally and specially rolled Pb-Ca-Sn alloys.

FIGS. 1 and 2 illustrate the significance of fast rolling low-tin alloy (i.e., conventionally or specially) and high-tin alloy (i.e., specially) in achieving high temperature strength stability. FIG. 1 contrasts the long term, high temperature tensile strength stability of the fast-rolled, low-tin alloys with low-tin alloys rolled slowly (i.e., about 30 to 45 minutes between stations) and higher tin alloys conventionally rolled both fast and slow while FIG. 2 makes a similar contrast for the specially-rolled, high-tin alloys. The high temperature strength stability of the fast-rolled, low-tin alloys of the present invention is shown by the generally horizontal band in the 5000 psi to 6500 psi range of the graph of FIG. 1, while the relative instability and low level of residual high temperature strength after soaking at 150° F. of the other alloys and working schedules are shown by the generally exponentially configured, rapidly declining bands shown. Likewise, the high temperature strength stability of the high-tin, fast-rolled (special schedule) is shown by the generally horizontal band in the 5000 psi to 7000 psi range of the graph of FIG. 2. The bands shown on the FIGS. represent a consolidation of a number of tests conducted within the categories defined thereby. In this regard, the fast-rolled (i.e., conventionally and specially) samples had all their rolling performed in one direction and were started and completed all within a matter of several seconds, with no more than about 15 seconds delay between any two rolling stations. The longest inter-station intervals occurred at the beginning of the series of roll stations where the strip was thickest. Inter-station intervals of much less than a second were experienced near the end of the rolling mill where the strip was thinnest and moving at speeds over 12 times the speed at which it entered the mill. This work was performed on tandem mills having from 6 to 9 pairs of coacting, 10 in. diameter, tongue-in-groove, mating rollers in series spaced about 1 foot apart. In the conventionally rolled strip, the percent reduction of strip thickness at each station varied from test to test and from station to station during each test, but fell within the range of about 18% to about 44%. For example, one of the rolling schedules simply reduced the strip by 30% of its previous thickness at each stand. Another schedule involved a six (6) stage reduction as follows: 29.6%/26.3%/36.6%/35.1%/25.6%/53.2%. Still another schedule involved a six (6) stage reduction as follows: 30%/23.8%/28.7%/33.3%/47.3%/50%. The as-cast strip varied from about 0.375 in. to about 0.75 in. and was reduced to about 0.048 in. thick. In the specially rolled strip, the constant station-to-station thickness reduction varied from about 0.039 in. to about 0.058 in. per station for an overall reduction of 0.35 in. The slow-rolled samples took about 4½ hours to complete and were worked on a reversing mill wherein the strip stock was first fed in one direction through the mill, the mill adjusted for a smaller roller clearance and the strip passed back through the same rollers but in the opposite direction. This was repeated for six (6) reductions with an approximate delay of about 45 minutes between each pass through the mill. Percent reductions varied but were generally in the same range as for the tandem mill tests (conventional schedule).

In one specific example of the invention, a substantially continuous Pb-Ca-Sn strip (i.e., 3.25 in wide×0.75 in. thick) was cast at a rate of about 7 ft./min. from a continuous caster such as disclosed in United States Patent Application Matter et al Ser. No. 819,897, filed July 28, 1977 and assigned to the assignee of the present application. The strip contained essentially 0.085% by weight Ca, 0.25% by weight Sn and the balance principally lead. The strip was water cooled to room temperature and, within about 10 minutes after casting, fed directly into a tandem rolling mill having seven (7) in-line rolling stations spaced approximately one (1) foot apart. Each rolling station comprises a pair of coacting, tongue-in-groove rolls approximately 10 in. in diameter. The female roller received the strip at the bottom of the circumferential groove while the male roller rolled within the groove in close proximity to the walls thereof and acted directly upon the strip moving between the rolls. The reduction schedule was set such that each station reduced the thickness of the strip entering it by about 36% such that the 0.75 in. thick strip entering the mill at about 7 ft./min. left the mill only 0.045 in. thick and moving at a rate of about 119 ft./min. The mill was continuously bathed in water such that the exit temperature of the strip rose only slightly to less than about 100° F. at the exit end of the mill. By this schedule, the longest time interval between cold rolling stations was that which occurred between the first and second rolling stations and amounted to something less than about 8 seconds, while the shortest time interval between stations occurred between the sixth and seventh stations and was something under about 1 second. The strip was then allowed to stand at room temperature for at least 30 days or longer before testing. The strip recrystallized to approximately 75% of complete recrystallization within about 2 weeks following rolling and over 90% by the end of 30 days. Test specimens (i.e., 0.75 in. wide×5. in. long) were then cut from the strips and specimens placed in an oven at 150° F. and allowed to soak for up to 17 months. Periodically, specimens were removed from the oven and tensile tested in a 12,000 lb. Tinius Olsen compression-tensile machine at a pulling rate of 1 in./min. Specimens so tested have displayed a slightly declining ultimate tensile strength near 6000 psi over the 17 month test period, and the test continues.

In another example, a 0.5 in. ×3.25 in. strip was cast at a speed of about 50 ft./min. on a hazelett continuous belt caster, water cooled to room temperature and fed to the entrance of a six (6) roller mill like that described in the first example within about 3 min. of casting. The strip contained 0.085% by weight Ca. 0.25% by weight tin and the balance principally lead. The strip was reduced to 0.045 in. in six (6) substantially equal percentage reductions (i.e., about 35% each) and exited the mill at about 680 ft./min. and at a temperature of about 120° F. By this rolling schedule, the longest time interval between cold rolling stations was that which occurred between the first and second stations and amounted to something less than about 1 second, while the shortest time interval between stations occurred between the fifth and sixth stations and was something about 0.1 second in duration. The strip was allowed to stand at room temperature for at least 30 days or longer before testing. The strip so produced recrystallized to approximately 75% of complete recrystallization within about 2 weeks following rolling and over 90% by the end of 30 days. Test specimens were then prepared and tested as with the first example and displayed a slightly declining ultimate tensile near 6000 psi over the 17 month test period, and the test continues.

FIG. 4 depicts the microstructure of a lead alloy containing 0.094% by weight Ca and 0.3% by weight Sn (i.e., cast ½ in. thick×1⅜ in. wide) unidirectionally fast-rolled according to the following 6 stage reduction schedule 30%/28%/35%/35%/25%/18%. FIG. 5 depicts the microstructure of a lead alloy containing 0.098% by weight Ca and 0.2% by weight Sn (i.e., cast ¾ in. thick and ¾ in. wide) unidirectionally fast-rolled according to the following 8 stage reduction schedule 32%/32%/32%/15%/30%/42%/8%/18%. Small islands of structureless phase A are shown distributed throughout the pearlite-like lamellar-structured phase B.

Corrosion tests were performed on specimens of unheated grids made, as above. The test was an accelerated corrosion test for simulating the corrosive environment of pasted grids in an actual battery and involved embedding the grid in a bed of fine sand in a cell compartment, filling the cell with 1% by volume $H_2SO_4$ heated to about 190° F. and anodically polarizing the grid at 0.4 amps constant current against a pure lead cathode. The grids so tested displayed a surprising resistance to corrosion and especially the intergranular-type corrosion which eats rapidly through the grain boundaries of the alloy causing grid wires to break, plates to drop off of plate lugs, etc. This was indeed surprising as heretofore it has been believed that the only way to prevent catastrophic grid failure in wrought, Pb-Ca-Sn grids due to intergranular corrosion was to prevent recrystallization and the formation of grain boundaries resulting therefrom. Metalographic analysis of the grids showed the aforesaid fine uniform recrystallized grain structure and uniform distribution of islands of $\alpha$ solid solution throughout the matrix.

While this invention has been disclosed primarily in terms of specific examples thereof, it is not intended to be restricted thereto but rather only to the extent set forth hereafter in the claims which follow.

I claim:

1. A process for making wrought, lead-calcium, automotive, battery grids comprising the steps of: casting a substantially continuous strip of alloy consisting essentially of about 0.07% to about 0.11% by weight calcium, less than about 1.5% by weight tin and the balance principally lead, said calcium and tin alloyants being precipitateable out of solid solution with said lead upon aging; and continuously rolling said strip rapidly in one direction through a plurality of rolling stations to significantly reduce its thickness, said rolling being such as to cold work said alloy by a sufficient amount to induce strain hardening, and at a sufficient rate as not to induce any significant strain aging of said strip during said rolling, and so as to yield an alloy which recrystallizes at room temperature to a substantially fine-grained structure having small islands of a uniform-alloyant-content structureless phase dispersed throughout a pearlite-like lamellar-structure phase having alternate layers of Ca-rich and Ca-lean lamella within about 30 days after said rolling.

2. A process for making wrought, lead-calcium, automotive, battery grids comprising the steps of: casting a strip of alloy consisting essentially of about 0.07% to about 0.11% by weight calcium, from 0% to no more than about 0.35% by weight tin and the balance principally lead; and continuously rolling said strip rapidly in one direction through a plurality of rolling stations to significantly reduce its thickness, said rolling being such as to cold work said alloy by a sufficient amount to induce strain hardening and at a sufficient rate as not to induce any significant strain aging of said strip during said rolling, and so as to yield an alloy which recrystallizes at room temperature to a substantially fine-grained structure within about 30 days of said rolling, has a 150° F. tensile strength stability in excess of 1 year, and has a low susceptibility to intergranular corrosion.

3. A process for making wrought, lead-calcium, automotive, battery grids comprising the steps of: continuously casting an alloy strip consisting essentially of about 0.08% to about 0.1% calcium, about 0.2% to about 0.35% by weight tin and the balance principally lead; and before any significant age hardening occurs, passing said strip in one direction quickly through a plurality of serially arranged cold rolling stations and therein incrementally reducing the thickness thereof at each station by about 35% of the thickness of the strip entering said station and such that the time interval between successive stations is less than about 30 seconds so as to yield a strip is produced which substantially recrystallizes within about 30 days of said rolling, has a 150° F. tensile strength stability of at least about 5500 psi for a period of at least 1 year and has a low susceptibility to intergranular corrosion.

4. A process for making wrought, lead-calcium, automotive, battery grids comprising the steps of: continuously casting an alloy strip consisting essentially of about 0.07% to about 0.11% calcium, about 0.35% to about 1.5% by weight tin and the balance principally lead; and before any significant age hardening occurs, passing said strip in one direction quickly through at least six serially arranged cold rolling stations and therein significantly reducing the thickness thereof in substantially equal thickness increments and such that the time interval between successive stations is less than about 30 seconds so as to yield a strip which substantially recrystallizes at room temperature within about 30 days of said rolling, has a 150° F. tensile strength stability of at least about 5500 psi for a period of at least 1 year and has a low susceptibility to intergranular corrosion.

* * * * *

UNITED STATES PATENT AND TRADEMARK OFFICE
CERTIFICATE OF CORRECTION

PATENT NO. : 4,228,580
DATED : October 21, 1980
INVENTOR(S) : Robert C. Matter

It is certified that error appears in the above-identified patent and that said Letters Patent are hereby corrected as shown below:

Column 9, line 18, delete "is produced".

Signed and Sealed this

Twenty-seventh Day of October 1981

[SEAL]

Attest:

GERALD J. MOSSINGHOFF

*Attesting Officer*     *Commissioner of Patents and Trademarks*